(12) United States Patent
Stall (10) Patent No.: US 6,896,092 B2
(45) Date of Patent: May 24, 2005

(54) HYDRAULIC STEERING DEVICE

(75) Inventor: Eugen Stall, Neunkirchen (DE)

(73) Assignee: Still GmbH (DE)

( * ) Notice: Subject to any disclaimer, the term of this patent is extended or adjusted under 35 U.S.C. 154(b) by 0 days.

(21) Appl. No.: 10/418,179

(22) Filed: Apr. 17, 2003

(65) Prior Publication Data

US 2004/0011587 A1 Jan. 22, 2004

(30) Foreign Application Priority Data

Apr. 18, 2002 (DE) .......................................... 102 17 358
Jan. 10, 2003 (DE) .......................................... 103 00 686

(51) Int. Cl.$^7$ ................................................ B62D 5/06
(52) U.S. Cl. ................................................... 180/403
(58) Field of Search ................................. 180/403, 417, 180/421, 422, 423

(56) References Cited

U.S. PATENT DOCUMENTS

| | | | |
|---|---|---|---|
| 4,703,819 A | * | 11/1987 | Hosotani ..................... 180/403 |
| 4,955,445 A | | 9/1990 | Kauss |
| 5,020,618 A | * | 6/1991 | Nagao ......................... 180/403 |
| 5,457,631 A | * | 10/1995 | Momose ........................ 701/43 |
| 5,941,338 A | * | 8/1999 | Miller et al. ................ 180/421 |
| 6,102,150 A | | 8/2000 | Bohner et al. |

FOREIGN PATENT DOCUMENTS

| | | |
|---|---|---|
| EP | 0 872 405 A2 | 10/1998 |
| EP | 0 937 628 A2 | 8/1999 |

* cited by examiner

Primary Examiner—Kevin Hurley
(74) Attorney, Agent, or Firm—Webb Ziesenheim Logsdon Orkin & Hanson, P.C.

(57) ABSTRACT

A hydraulic steering device (1) has a steering angle transmitter (2) in communication with a steering valve (3) which, as a function of the actuation of the steering angle transmitter (2), controls the communication between a steering drive (11), e.g., a steering cylinder (12) with a hydraulic pressure source (5) and a reservoir (9), and a correction device (15). The correction device (15) provides synchronization of the position of the steering angle transmitter (2) with the position of the steering angle drive (11) when the steering drive (11) or steering angle transmitter (2) is in a reference range and the position of the steering angle transmitter (2) and/or of the steering drive (2) varies from the reference range.

20 Claims, 2 Drawing Sheets

HYDRAULIC STEERING DEVICE

CROSS-REFERENCE TO RELATED APPLICATIONS

This application corresponds to German Application Nos. 102 17 358.3, filed Apr. 18, 2002, and 103 00 686.9, filed Jan. 10, 2003, both of which are herein incorporated by reference in their entirety.

BACKGROUND OF THE INVENTION

1. Field of the Invention

This invention relates to a hydraulic steering device having a steering angle transmitter and which is in communication with a steering valve. As a function of the actuation of the steering angle transmitter, the steering valve controls the communication between a steering drive, e.g., a steering cylinder, with a hydraulic pressure source and a reservoir. A correction device provides a synchronization between the position of the steering angle transmitter and the position of the steering drive.

2. Technical Considerations

Hydraulic steering devices in which a steering valve is actuated by a steering angle transmitter (for example a steering wheel) and controls the pressurization of a steering drive (for example of a steering cylinder actively connected to a steering axle with the steered wheels) are used in industrial vehicles, such as construction machines or industrial trucks. On known hydraulic steering devices of this type, there can be discrepancies between the position of the steering drive and the position of the steering angle transmitter (e.g., a steering wheel) as a result of leakage in the steering valve and/or the steering cylinder.

As a result of this leakage, the rotational position of the steering wheel and the position of the steered wheels do not always coincide and are, therefore, sometimes unsynchronized. In particular for the straight-ahead travel position of the steering wheel, different rotational positions of the steering wheel can occur as a result of the leakage. By "straight-ahead travel position" is meant the position of the steering wheel to make the vehicle move forward in a straight path. For an operator of an industrial vehicle of this type, this can lead to unpleasant situations since the correspondence between the rotational position of the steering wheel with the position of the steered wheels is not correct and stable. In addition, this lack of synchronization can lead to hazardous operating situations if the operator specifies the straight-ahead travel position from the steering angle transmitter but the vehicle moves in a curve on account of the unsynchronized correspondence between the position of the steering angle transmitter and the position of the steering drive. This operational behavior of known hydraulic steering devices can also lead to situations in which the operator must make constant corrections in the steering angle transmitter to maintain the desired direction of travel of the industrial vehicle as it travels a long distance straight ahead. As a result of which, the operator of such an industrial vehicle must maintain a high degree of concentration, which can lead to rapid fatigue.

Correction devices are known to synchronize the position of the steering angle transmitter with the position of the steering drive in hydraulic steering devices and, thus, to make possible a synchronization between the position of the steering angle transmitter and the position of the steering drive. In these known correction devices, the position of the steering angle transmitter (and thus the set-point for the steering deflection) is measured by means of an absolute sensor located on the steering angle transmitter. The current value of the steering deflection is determined by means of another absolute sensor located on the steering drive, for example on the steering cylinder. These absolute sensors are in communication with an electronic control device in which a constant and continuous comparison of the set-point and the actual value of the steering deflection is performed. Therefore, in the event of a discrepancy between the position of the steering drive and the position of the steering angle transmitter, it becomes possible to re-establish a synchronization of the steering drive with the position of the steering angle transmitter. Absolute sensors of this type (such as proportional sensors that measure the position of the steering angle transmitter and the position of the steering drive) and the corresponding electronic control device are complex and expensive to manufacture. As a result of which, a hydraulic steering device with such a known correction device is relatively expensive to manufacture.

Therefore, it is an object of the invention to provide a hydraulic steering device with a correction device which makes it possible to achieve synchronization between the position of the steering drive and the position of the steering angle transmitter but with lower design and manufacturing costs than known systems.

SUMMARY OF THE INVENTION

The invention teaches that when the steering drive or steering angle transmitter are within a reference range and when the position of the steering angle transmitter and/or of the steering drive deviates from the reference range, the correction device makes it possible to achieve a synchronization of the position of the steering angle transmitter with the position of the steering drive. The invention teaches that an adjustment between the position of the steering angle transmitter and the position of the steering drive can be limited to a reference range. Thus, a reference position occurs only in the reference position or in the reference range if and to the extent that there is a corresponding deviation between the position of the steering angle transmitter and the position of the steering drive. Because the invention teaches that only a reference position needs to be measured to synchronize the steering device, simple and economical measurement devices can be used on the steering angle transmitter and the steering drive. As a result of which, the steering device with the correction device is more economical to design and manufacture and does not require an electronic control device.

A synchronization of the position of the steering angle transmitter with the position of the steering drive can be achieved, for example, by feeding hydraulic pressure to the steering drive, by a discharge of hydraulic pressure from the steering drive, or by a short-circuit connection on the steering drive.

In one advantageous configuration of the invention, the reference range is in the range of the straight-ahead travel position of the steering drive and/or of the steering angle transmitter. On industrial vehicles in the form of construction machines or industrial trucks, the straight-ahead travel position occurs with great frequency in operation. As a result of the intermittent synchronization of the steering device in the straight-ahead travel position, it becomes possible to ensure that a synchronization between the position of the steering angle transmitter and the position of the steering drive is achieved in the operation of the industrial vehicle.

The synchronization of the steering device can thereby occur in a phase of straight-ahead travel or can extend over a plurality of straight-ahead travel phases of the industrial vehicle.

In one aspect of the invention, the correction device includes a position measurement device, e.g., a switching device, which is in communication with the steering drive and/or the steering angle transmitter. By means of which, a straight-ahead travel position and a non-straight-ahead travel position of the steering drive and/or of the steering angle transmitter can be detected. As a result of the synchronization of the steering device limited to the straight-ahead travel position, a simply constructed switching device, for example a position sensor, can be used to detect the position of the steering drive or of the steering angle transmitter. Such a switching device is cheaper to manufacture than an absolute sensor of the type used in steering devices of the known art.

As a result of the synchronization of the steering device only in the straight-ahead travel position, a changeover device can be provided to detect the position of the steering angle transmitter and/or of the steering drive. By means of the changeover device, a straight-ahead travel position and at least one non-straight-ahead travel position of the steering angle transmitter and/or of the steering drive can be detected. A changeover device of this type, compared to the absolute sensors used in steering devices of the known art, has a simple construction and can be manufactured at a lower cost.

The changeover device can have a plurality, e.g., two or three, positions. It is particularly advantageous if the changeover device has a straight-ahead travel position, a first non-straight-ahead travel position, and a second non-straight-ahead travel position. The position of the steering angle transmitter and/or of the steering drive with reference to the straight-ahead travel position can be detected in the first non-straight-ahead travel position and in the second non-straight-ahead travel position. With a changeover device of this type, the position of the steering wheel or the position of the steering cylinder relative to the straight-ahead travel position can be detected. For example, the position of a steering angle transmitter (e.g., a steering wheel) in the direction of rotation to the left and/or right of the straight-ahead travel position can be detected. As a result of which, deviations in both directions (e.g., left and right) of the steering angle transmitter from the straight-ahead travel position can be identified.

If the steering cylinder is a dual-action cylinder having a first control compression chamber in communication with the steering valve via a first control line and a second control compression chamber in communication with the steering valve via a second control line, there are advantages if, for synchronization, the first and/or the second control compression chambers can be placed in communication with the hydraulic fluid reservoir. This arrangement is a simple way to synchronize the steering device by diverting hydraulic fluid medium to the reservoir.

For the communication of the corresponding control compression chamber of the steering cylinder with the reservoir, one embodiment of the invention teaches that a stop valve can be provided. The control compression chamber, which is in communication with the hydraulic pressure source by means of the steering valve, can be placed in communication in a simple manner for the synchronization of the steering drive with the reservoir if the stop valve is located in a connecting line that connects the control line with the reservoir. The stop valve in this case can be an electrically actuated, controllable stop valve.

A synchronization of the steering device can be achieved in a simple manner by means of the correction device when the switching device is in the straight-ahead travel position and when the changeover device is in the non-straight-ahead travel position by moving the stop valve into an open position. A connection of the control line, which is in communication via the steering valve with the hydraulic pressure source, and the reservoir can be established. As a result, during the straight-ahead travel phases of the industrial vehicle, a synchronization of the position of the steering angle transmitter with the position of the steering drive can be achieved in a simple manner by a connection of the hydraulic fluid fed via the steering valve to the steering drive to the reservoir.

In one configuration of the invention, the changeover device can be an electrical switch, such as an electrical selector switch. With a switch of this type, it becomes possible in a simple manner to identify a straight-ahead travel position, a first and a second non-straight-ahead travel position of the steering angle transmitter and/or of the steering drive.

A simple construction for a steering device with a correction device can thereby be achieved if the switch has a straight-ahead travel position, first and second non-straight ahead travel positions and is connected on the input side with an electrical control line which is in communication with an electrical energy source. The switch can be connected on the output side to a first electrical control line, which leads to an electrically actuated stop valve located in the first connecting line running from the first control line to the reservoir. The switch can be connected to a second electrical control line which leads to an electrically actuatable stop valve located in a second connecting line running from a second control line to the reservoir. With an electrical switch of this type, the corresponding stop valve(s) can be actuated in a simple manner.

If, in the first non-straight-ahead travel position of the steering angle transmitter and/or of the steering drive the first control line is in communication via the steering valve with the hydraulic pressure source and in the second non-straight-ahead travel position of the steering angle transmitter and/or of the steering angle transmitter the second control line is in communication via the steering valve with the hydraulic pressure source, the switch in the first non-straight-ahead travel position creates the connection of the first control line with the first electrical control line and in the second non-straight-ahead travel position creates the connection of the electrical control line. To the second electrical control line to synchronize the steering device, it becomes possible in a simple manner to discharge the corresponding control line which is in communication via the steering valve with the hydraulic pressure source to the reservoir.

A simple construction of the correction device can also be achieved if the switching device is in the electric control line. The switching device can be an electrical switch, such as a conventional "make contact" time switch. The switch can be moved into the closed position when the steering drive or steering angle transmitter is in the straight-ahead travel position. Therefore, in one embodiment correction device has only two simple electrical switches to achieve a synchronization of the steering device by means of electrically actuatable stop valves.

In an additional realization of the invention, the changeover device can be a hydraulic valve, such as a rotary disk valve. With a hydraulic valve in the form of a rotary disk valve, which is in a driving connection with a steering angle transmitter in the form of a steering wheel and/or with the steering drive realized in the form of a steering cylinder, it is also possible to economically identify a straight-ahead position as well as first and second non-straight-ahead travel positions of the steering angle transmitter or of the steering drive.

In one advantageous configuration of the invention, the hydraulic valve is in communication with the steering angle transmitter and is attached to the steering valve or integrated into the steering valve. When the valve is associated with the steering angle transmitter, the valve can be attached easily and economically to the steering valve or integrated into the steering valve. If the steering valve is a rotary disk valve, the changeover valve can easily be formed by additional control edges on the steering valve and can thus be integrated into the steering valve. As a result of which, a reduced additional construction expense can be achieved for the valve.

It is particularly advantageous if the valve is a proportional valve. With a proportional valve, control cross sections can be achieved that increase as a function of the variance of the position of the steering angle transmitter or of the steering drive from the reference range realized as the straight-ahead travel position. Thus, an increasing speed of equalization can be achieved as the position of the steering angle transmitter or of the steering drive differs increasingly from the reference position.

The hydraulic valve can have a straight-ahead travel position, a first non-straight-ahead travel position and a second non-straight-ahead travel position and can be in communication with the control lines on the input side and with a connecting line on the output side that leads to the reservoir. A stop valve can be located in each of the connecting lines.

If, in the first non-straight-ahead travel position of the valve the first control line is in communication via the steering valve with the hydraulic pressure source and the first control line is in communication with the connecting line that is in communication with the reservoir and in the second non-straight-ahead travel position of the valve the second control line is in communication via the steering valve with the hydraulic pressure source and the second control line is connected to the connecting line, it becomes possible in a simple manner to ensure that to achieve synchronization, the control line that is in communication with the hydraulic pressure source is discharged to the reservoir.

If the stop valve can be actuated, electrically, there is a simple control of the stop valve. The switching device can be an electrical switch, such as a make contact, which is in effective communication with the steering drive and/or with the steering angle transmitter and can be connected on the input side to a source of electrical energy. The switch can be connected on the output side to an electric control line connected to the electrically actuatable stop valve which is located in the connecting line. The switch can be switched into a closed position when the steering drive and/or the steering angle transmitter are in the straight-ahead travel position. For synchronization of the steering device, therefore, only one valve (such as a rotary disk valve) is needed that is in effective communication with the steering angle transmitter or the steering drive. The stop valve can be actuated as a function of the position of the steering drive or of the steering angle transmitter.

In one configuration of the invention, the stop valve(s) can be located on the steering valve or can be integrated into the steering valve. Consequently, a simple arrangement of the tubing of the stop valve or of the two stop valves can be achieved if the connecting lines are also realized in the steering valve. The connecting lines can thereby be simple channels in the steering valve which run from the control channels to the reservoir channel of the steering valve. The stop valve or the two stop valves can be simply flange-mounted on the steering valve.

It is particularly advantageous if a steering device of the invention is used in an industrial truck, in particular in a fork-lift truck. With the steering device of the invention, synchronization of the steering device can be achieved in industrial trucks at little additional cost. On industrial trucks which are often operated in narrow spaces, the use of such a steering device can make possible safer operation at a low additional design expense and low additional manufacturing costs for the correction device, because a clear and stable correspondence of the straight-ahead travel position of the steering angle transmitter and the straight-ahead travel position of the steering drive is ensured.

BRIEF DESCRIPTION OF THE DRAWINGS

Additional advantages and unique features of the invention are explained in greater detail below with reference to the exemplary embodiments that are illustrated in the accompanying schematic figures, in which.

DESCRIPTION OF THE PREFERRED EMBODIMENTS

Figure 1:
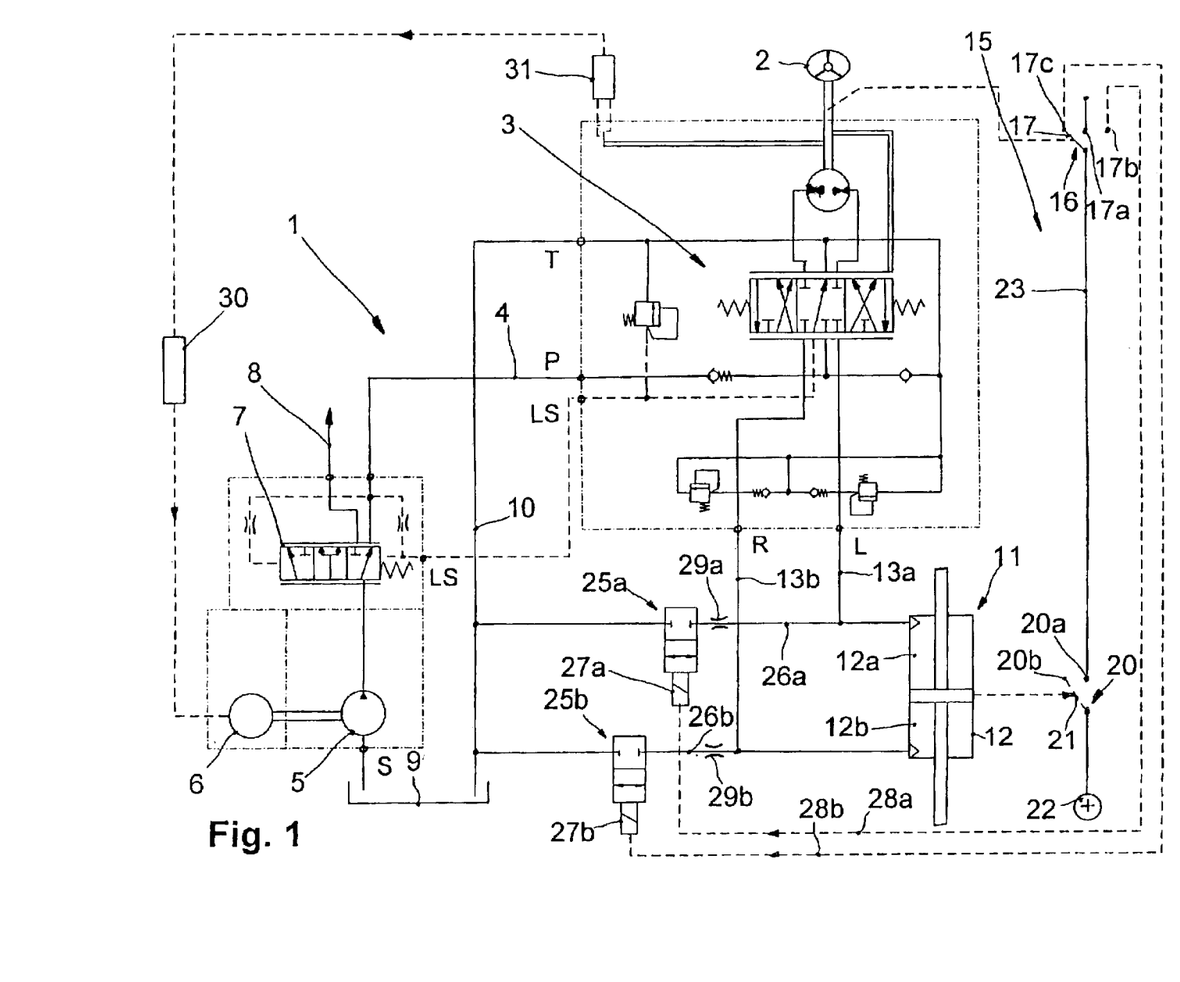
FIG. 1 is a schematic diagram (not to scale) of a first exemplary embodiment of a steering device of the invention.

FIG. 1 shows a first embodiment of a hydraulic steering device 1 of an industrial vehicle in the form of an industrial truck. The steering device 1 has a steering angle transmitter 2, for example a steering wheel, which is in effective communication with a steering valve 3. The steering valve 3 is shown edged in dot-dash lines and can be, for example, a conventional orbital steering motor. The steering valve 3 is in communication with a delivery line 4 of a hydraulic pressure source 5 (such as a pump), which can be in a drive connection with a drive machine 6, for example an electric motor. Located in the delivery line 4 is a priority valve 7, which is connected on the output side to a delivery line 8 that runs to a hydraulic work system, for example a lifting drive, a tilting drive, and/or an accessory drive of the industrial truck, and ensures the priority supply of the steering device 1. For the control of the drive machine 6, a control device 30 is provided which is in communication on the input side with a switch 31 which is in effective communication with the steering angle transmitter 2. In the event of an actuation of the steering angle transmitter 2 detected by the switch 31, the control device 30 actuates the drive machine 6, whereby hydraulic pressure is delivered from the hydraulic pressure source 5 into the delivery line 4.

The steering valve 3 is also connected to a reservoir line 10 which runs to a reservoir 9. The steering device I also has a steering drive 11 which can be realized, for example, in the form of a dual-action steering cylinder 12 located on a steering axle and can be effectively connected with the steered wheels in any conventional manner. The steering cylinder 12 can have a first control compression chamber 12a and a second control compression chamber 12b which are in communication via control lines 13a and 13b with the steering valve 3.

The invention teaches that the steering device 1 is provided with a correction device 15. The correction device 15 can have a changeover device 16 which, in the illustrated exemplary embodiment, is effectively connected with the steering angle transmitter 2 for the detection of the position of the steering angle transmitter 2. The changeover device 16 illustrated in FIG. 1 is an electrical switch 17, in particular a selector switch. The switch 17 thereby has a straight-ahead travel position 17a, a first non-straight-ahead travel position 17b, and a second non-straight-ahead travel position 17c.

The correction device 15 also has a position detection device which can be a switching device 20 which is in effective communication with the steering drive 11 to detect the position of the steering drive 11. The switching device 20 can be an electrical switch 21, in particular a conventional make contact type switch, located on the steering cylinder 12. The switching device 20 is in communication on the input side with an electric energy source 22. On the output side, the switching device 20 is connected to an electrical control line 23 which is in communication on the input side with the changeover device 16.

The correction device 15 also comprises stop valves 25a and 25b, which are located in connecting lines 26a and 26b, respectively, which run from the control lines 13a and 13b, respectively, to the reservoir line 10. The stop valves 25a, 25b are, in this exemplary case, electrically actuatable and each can have an actuator device 27a, 27b, respectively, which can be an electromagnet, for example a switching magnet. The actuator device 27a is in communication with an electrical control line 28a, which is connected to the output of the first non-straight-ahead travel position 17b of the changeover device 16. Accordingly, the actuator device 27b is in communication with an electrical control line 28b, which is connected to the output of the second non-straight-ahead travel position 17c of the changeover device 16.

The stop valves 25a, 25b are normally in a closed position but, in the event of an actuation of the actuator devices 27a, 27b, can be moved into an open position. Throttle devices 29a, 29b can be located in the connecting lines 26a, 26b.

The switching device 20, e.g., a switch 21, can be provided with a certain or selected hysteresis, and can be configured so that in the reference range, i.e., in the range of the straight-ahead travel position 20a of the steering drive 11 and, thus, of the steering cylinder 12, the switching device 20 is closed and, thus, the connection of the electrical energy source 22 with the changeover device 16 is created. The closed position of the switching device 20 therefore represents a straight-ahead travel position 20a and the open position of the switching device 20 forms a non-straight-ahead travel position 20b.

The changeover device 16, which can be the selector switch 17, detects the position of the steering angle transmitter 2, whereby the changeover device 16 is in the straight-ahead travel position 17a if the steering angle transmitter 2 is in a position for straight-ahead travel. If the steering angle transmitter 2 is moved into the first non-straight-ahead travel position 17b, for example, the steering angle transmitter 2 (e.g., the steering wheel) is in the rotational position to the right of the straight ahead travel position. In the first non-straight-ahead travel position 17b of the steering angle transmitter 2, the steering valve 3 is moved to the right in FIG. 1. As a result of which, the delivery line 4 is in communication with the control line 13a. Accordingly, the changeover device 16 is in the second non-straight ahead travel position 17c when the steering angle transmitter 2 (e.g., the steering wheel) is moved in the direction of rotation left of the straight-ahead travel position. In the second non-straight ahead travel position 17c of the steering angle transmitter 2, the steering valve 3 is moved in the direction of the position shown in FIG. 1, in which the delivery line 4 is in communication with the control line 13b.

It goes without saying that an arrangement is possible in which the position detection device realized in the form of the switching device 20 is in connection with the steering angle transmitter 2 and the changeover device 16 is effectively connected to the steering drive 1.

Figure 2:
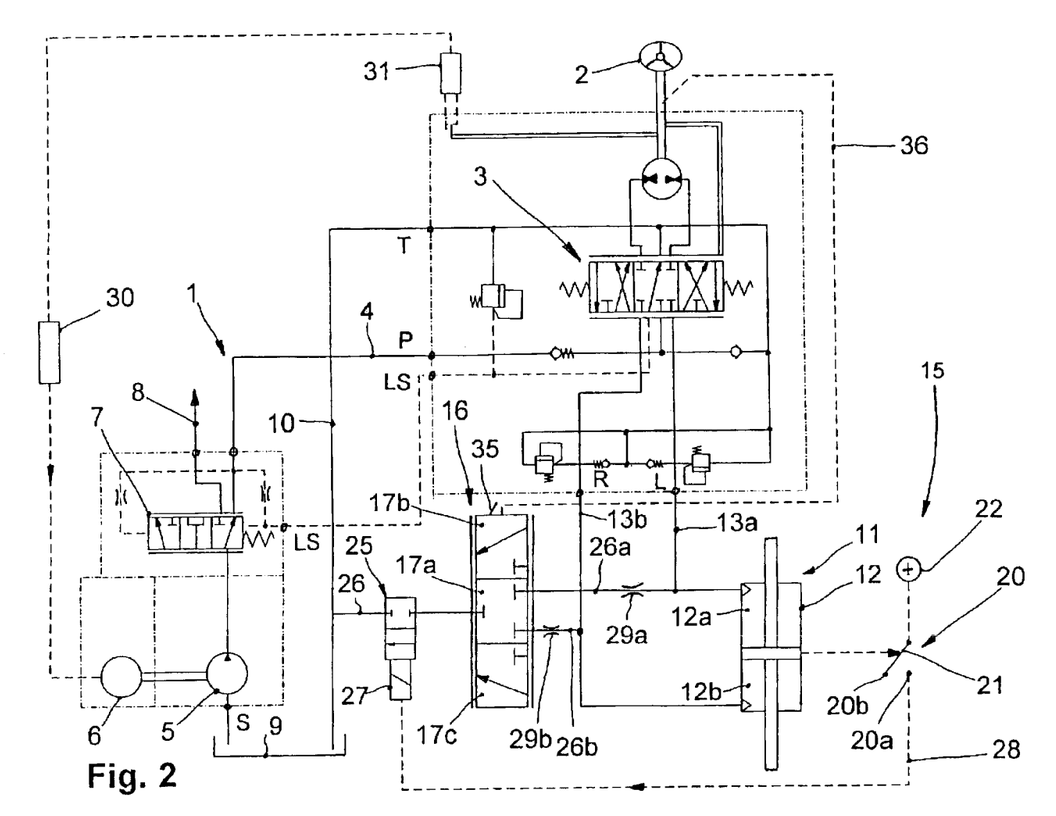
FIG. 2 shows a second exemplary embodiment (not to scale) of a hydraulic steering device of the invention.

FIG. 2 shows a second embodiment of a steering device 1' of the invention, in which similar components to those of the embodiment of FIG. 1 are identified by the same reference numbers.

The changeover device 16 is in this case realized in the form of a hydraulic valve 35, such as a rotary disk valve, which is non-rotationally connected with the steering angle transmitter 2, for example by means of a mechanical coupling device 36. In this case, when the steering valve 3 is a rotary disk valve, the valve 35 can be attached to the steering valve 3, or it can be integrated into the steering valve 3. The valve 35 is in communication on the input side with the connecting lines 26a, 26b that branch off from the control lines 13a, 13b and on the output side is connected to a connecting line 26 which runs to the reservoir line 10. A stop valve 25 is located in the connecting line 26. The valve 35 has a straight-ahead travel position 17a in which the connection between the connecting lines 26a, 26b to the connecting line 26 is blocked. In a first non-straight-ahead travel position 17b of the valve 35, the connecting line 26a is in communication with the connecting line 26 and is, therefore, discharged to the reservoir 9 when the stop valve 27 is actuated. In the second non-straight-ahead travel position 17c, the connecting line 26b is connected to the connecting line 26 which is in communication with the reservoir 9. As a position detection device, a switching device 20 is provided (such as a make contact 21), which is connected on the input side to the electric energy source 22 and is in communication on the output side with an electric control line 28 which runs to the actuator device 27 of the stop valve 25, which actuator device 27 can be a switching magnet. The closed position of the switching device 20 in turn forms, with a selected hysteresis, a straight-ahead travel position 20a as a reference range, and the open position of the switching device 20 forms a non-straight-ahead travel position 20b of the steering drive 11.

In the embodiment illustrated in FIG. 2, it is also possible for the valve 35 to be in effective communication with the steering drive and the position detector device, i.e., the switching device 20 to be in effective communication with the steering angle transmitter 2.

With reference to FIG. 1, in the steering device 1 with the correction device 15, the synchronization is performed as follows.

If the steering drive 11 and, thus, the steering cylinder 12 is within the range of the straight-ahead travel position 20a, the switching device 20 realized in the form of a make contact 21 is in the closed position. As a result of which, as illustrated in FIG. 1, the electric energy source is in communication with the changeover device 16. In the embodiment illustrated in FIG. 2, in the closed position of the switch 21, the stop valve 27 is actuated into the open position.

If the steering angle transmitter 2 and, thus, the changeover device 16 is thereby within the range of the straight-ahead travel position 17a, as illustrated in FIG. 1, there is no communication between the control line 23 and one of the control lines 28a or 28b. Or, as illustrated in FIG. 2, no communication between the connecting lines 26a and 26b and the connecting line 26.

If, on account of leakage at the steering valve 3 or at the steering drive 11, the steering angle transmitter 2 indicates a position that is different from the straight-ahead travel position 17a, the changeover device 16, depending on the position of the steering angle transmitter 2, is moved in the direction of rotation to the right or to the left of the straight-ahead travel position into the first non-straight-ahead travel position 17b or into the second non-straight-ahead travel position 17c.

If, in the exemplary embodiment illustrated in FIG. 1, the steering drive 11 is in the straight-ahead travel position 20a and the steering angle transmitter 2, as a result of leakage, is to the left of the straight-ahead travel position, by means of the closed switch and the changeover device 16 that has been moved into the second non-straight-ahead travel position 17c, the stop valve 25b is moved by an actuation of the actuator device 27b into the open position. By means of the steering angle transmitter 2 which is to the left of the straight-ahead travel position 17a, the steering valve 3 is moved in the direction of the switch position shown on the left in FIG. 1, whereby the delivery line 4 is in communication with the control line 13b. The control line 13b in communication with the steering valve 3 with the delivery line 4 is, therefore, via the stop valve 25b which has been moved into the open position, placed in communication with the reservoir 9. The operator can, therefore, move the steering angle transmitter 2 into the straight-ahead travel position 17a, whereby the steering cylinder 12 remains in the straight-ahead travel position 20a. Thus, a synchronization is achieved between the position of the steering drive 11 and the position of the steering angle transmitter 2 to the straight-ahead travel position 17a, 20a which is defined as the reference position.

If, as a result of leakage, the steering angle transmitter 2 is to the right of the straight-ahead travel position 17a when the steering drive 11 is in the straight-ahead-travel position 20a, the stop valve 27a is actuated into the open position by means of the closed switch 21 and the changeover device 16 which is in the first non-straight-ahead travel position 17b. The steering valve 3 is thereby deflected in the direction of the switch position on the right in FIG. 1, as a result of which the control line 13a which is in communication with the delivery line 4 is placed in communication via the actuated stop valve 27a with the reservoir 9. The operator can, therefore, move the steering angle transmitter 2 toward the straight-ahead travel position 17a, whereby the steering drive 11 remains in the straight-ahead travel position 20a, and, thus, achieve a synchronized position between the steering angle transmitter 2 and the steering cylinder 12.

If, in the exemplary embodiment illustrated in FIG. 2, the steering drive 11 is in the straight-ahead travel position and, as a result of leakage the steering angle transmitter 2 is to the left of the straight-ahead travel position 17a by means of the closed switch 21, the stop valve 25 is moved by the actuator device 27 into the open position and the valve 35 is moved toward the second non-straight-ahead travel position 17c. By means of the steering angle transmitter 2 which is to the left of the straight-ahead travel position 17a, the steering valve 3 is moved toward the switch position shown on the left in FIG. 2, whereby the delivery line 4 is in communication with the control line 13b. The control line 13b which is in communication with the delivery line 4 is, therefore, discharged into the reservoir 9 via the valve 35, which is moved into the second non-straight-ahead travel position 17c, and the actuated stop valve 25. The operator can thus move the steering angle transmitter 2 into the straight-ahead travel position 17a, whereby the steering drive 11 remains in the straight-ahead travel position 20a and, thus, a synchronization is established between the position of the steering cylinder 12 and the position of the steering angle transmitter 2 in the straight-ahead travel position 17a, 20a.

When the steering angle transmitter 2 is in the straight-ahead travel position, if the steering drive 11, on account of leakage, is to the right of the straight-ahead travel position 17a, the stop valve 25 is actuated by means of the closed switch 21, whereby the valve 35 is moved toward the first non-straight-ahead travel position 17b. The steering valve 3 is thereby moved in the direction of the switch position shown on the right in FIG. 1, as a result of which hydraulic fluid flows from the delivery line 4 into the control line 13a. The control line 13a is discharged to the reservoir 9 by means of the valve 35 which is moved into the first non-straight-ahead travel position 17b and the actuated stop valve 25. The operator can, therefore, move the steering angle transmitter 2 toward the straight-ahead travel position 17a and, thus, into the straight-ahead travel position 20a of the steering drive 11 and create a synchronized position between the steering angle transmitter 2 and the steering drive 11.

The valve 35 can thereby be realized in the form of a proportional valve with control cross sections that increase as the valve is opened wider. Consequently, depending on the variance between the position of the steering angle transmitter 2 from the straight-ahead travel position 17a and, thus, as a function of the control movement of the valve 35, flows of increasing volume are possible, as a result of which, when there is a great discrepancy between the position of the steering angle transmitter 2 and the position of the steering drive 11, a high rate of equalization and thus a rapid synchronization becomes possible and, when there are small discrepancies, a low equalization speed becomes possible, the result of which is a sensitive and accurate synchronization.

As a result of the intermittent equalization of the position of the steering angle transmitter 2 which occurs in normal traction operation and the position of the steering drive 11 in the straight-ahead travel position 20a as the reference range of the industrial vehicle, it thereby becomes possible to use a simple and economical position detection device, for example a switching device 20, and a simple and economical changeover device 16, as a result of which the cost and effort involved for the correction device 15 remains low.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A hydraulic steering device, comprising:
   a steering drive comprising a steering cylinder;
   a steering angle transmitter;
   a steering valve connected to a hydraulic pressure source and a reservoir; and
   a correction device to provide synchronization of the position of the steering angle transmitter and the position of the steering drive, wherein the steering angle transmitter is in communication with the steering valve, wherein the steering valve controls the connection between the steering cylinder with the pressure source and the reservoir as a function of the actuation of the steering angle transmitter, wherein the correction device provides synchronization of the position of the steering angle transmitter and the position of the steering drive when the steering drive or steering angle transmitter are in a reference range and when the position of the steering angle transmitter or of the steering drive are not within the reference range, and wherein the steering device further includes a switching device, wherein the switching device is a make contact electrical switch located in an electrical control line, and wherein the switch is moved into a closed position when the steering drive or steering angle transmitter is in the straight-ahead travel position.

2. The hydraulic steering device as claimed in claim 1, wherein the reference range is in the vicinity of a straight-ahead travel position of the steering drive or of the steering angle transmitter.

3. The hydraulic steering device as claimed in claim 2, wherein the correction device has a position detection device in effective communication with the steering drive or the steering angle transmitter, by means of which position detection device a straight-ahead travel position and at least one non-straight-ahead travel position of the steering drive or of the steering angle transmitter can be detected.

4. The hydraulic steering device as claimed in claim 2, wherein the correction device includes a changeover device connected with the steering angle transmitter or the steering drive, by means of which changeover device a straight-ahead travel position and at least one non-straight-ahead travel position of the steering angle transmitter or of the steering drive can be detected.

5. The hydraulic steering device as claimed claim 1, wherein the steering cylinder is a dual-action cylinder having a first control compression chamber and a second control compression chamber, wherein the first control compression chamber is in communication with the steering valve by a first control line and the second control compression chamber is in communication with the steering valve by a second control line, wherein to synchronize the position of the steering angle transmitter with the position of the steering drive, the first control compression chamber or the second control compression chamber of the steering cylinder can be put in communication with the reservoir.

6. The hydraulic steering device as claimed in claim 5, including a stop valve provided for communication between at least one of the control compression chambers and the reservoir.

7. The hydraulic steering device as claimed in claim 6, wherein the stop valve is located in a connecting line that connects the control line with the reservoir.

8. The hydraulic steering device as claimed in claim 6, wherein the stop valve is an electrically actuated, controllable stop valve.

9. The hydraulic steering device as claimed in claim 4, wherein the changeover device is a hydraulic valve.

10. The hydraulic steering device as claimed in claim 9, wherein the hydraulic valve is a proportional valve.

11. The hydraulic steering device as claimed in claim 6, wherein the stop valve is located on the steering valve or is integrated into the steering valve.

12. The hydraulic steering device as claimed in claim 11, wherein the connecting lines are formed in the steering valve.

13. A fork-lift truck comprising the hydraulic steering device as claimed in claim 1.

14. The hydraulic steering device as claimed in claim 3, wherein the position detecting device is a switching device.

15. The hydraulic steering device as claimed in claim 3, wherein the correction device has a changeover device connected with the steering angle transmitter or the steering drive, by means of which changeover device a straight-ahead travel position and at least one non-straight-ahead travel position of the steering angle transmitter or of the steering drive can be detected.

16. A hydraulic steering device, comprising:

a steering drive comprising a steering cylinder;

a steering angle transmitter;

a steering valve connected to a hydraulic pressure source and a reservoir; and a correction device to provide synchronization of the position of the steering angle transmitter and the position of the steering drive, wherein the steering angle transmitter is in communication with the steering valve, wherein the steering valve controls the connection between the steering cylinder with the pressure source and the reservoir as a function of the actuation of the steering angle transmitter, wherein the correction device provides synchronization of the position of the steering angle transmitter and the position of the steering drive when the steering drive or steering angle transmitter are in a reference range and when the position of the steering angle transmitter or of the steering drive are not within the reference range and, wherein the steering device further includes a switching device, wherein by means of the correction device, when the switching device is in the straight-ahead travel position and when a changeover device is in the non-straight-ahead travel position, it is possible to establish communication between a control line in communication via the steering valve with the hydraulic pressure source and the reservoir by actuating the a stop valve into an open position.

17. A hydraulic steering device, comprising:

a steering drive comprising a steering cylinder;

a steering angle transmitter;

a steering valve connected to a hydraulic pressure source and a reservoir; and a correction device to provide synchronization of the position of the steering angle transmitter and the position of the steering drive, wherein the steering angle transmitter is in communication with the steering valve, wherein the steering valve controls the connection between the steering cylinder with the pressure source and the reservoir as a function of the actuation of the steering angle transmitter, wherein the correction device provides synchronization of the position of the steering angle transmitter and the position of the steering drive when the steering drive or steering angle transmitter are in a reference range and when the position of the steering angle transmitter or of the steering drive are not within the reference range, wherein the reference range is in the vicinity of a straight-ahead travel position of the steering drive or of the steering angle transmitter, wherein the correction device includes a changeover device connected with the steering angle transmitter or the steering drive, by means of which changeover device a straight-ahead travel position and at least one non-straight-ahead travel position of the steering angle transmitter or of the steering drive can be detected, wherein the changeover device is a hydraulic valve, and wherein the hydraulic valve is in effective communication with the steering angle transmitter and is attached to the steering valve or integrated into the steering valve.

18. A hydraulic steering device, comprising:

a steering drive comprising a steering cylinder;

a steering angle transmitter;

a steering valve connected to a hydraulic pressure source and a reservoir; and a correction device to provide synchronization of the position of the steering angle transmitter and the position of the steering drive, wherein the steering angle transmitter is in communication with the steering valve, wherein the steering valve controls the connection between the steering cylinder with the pressure source and the reservoir as a function of the actuation of the steering angle transmitter, wherein the correction device provides synchronization of the position of the steering angle transmitter and the position of the steering drive when the steering drive or steering angle transmitter are in a reference range and when the position of the steering angle transmitter or of the steering drive are not within the reference range, wherein the reference range is in the vicinity of a straight-ahead travel position of the steering drive or of the steering angle transmitter, wherein the correction device includes a changeover device connected with the steering angle transmitter or the steering drive, by means of which changeover device a straight-ahead travel position and at least one non-straight-ahead travel position of the steering angle transmitter or of the steering drive can be detected, wherein the changeover device is a hydraulic valve, and wherein the hydraulic valve has a straight-ahead travel position, a first non-straight-ahead travel position, and a second non-straight-ahead travel position and is connected on the input side to the control lines and on the output side to a connecting line that leads to the reservoir, in which connecting line a stop valve is located.

19. The hydraulic steering system as claimed in claim 18, wherein in the first non-straight-ahead travel position of the valve, the first control line is in communication via the steering valve with the hydraulic pressure source, the first control line is in communication with the connecting line which is in communication with the reservoir and in the second non-straight-ahead travel position of the valve, wherein the second control line is in connection via the steering valve with the hydraulic pressure source, and the second control line is connected to the connecting line.

20. The hydraulic steering device as claimed in claim 18, including a switching device, wherein the stop valve can be actuated electrically, wherein the switching device is a make contact electrical switch, which is in effective communication with the steering drive or the steering angle transmitter and is connected on the input side to an electric energy source, wherein the switch is connected on the output side to an electrical control line, which leads to the electrically actuatable stop valve located in the connecting line, wherein the switch is moved into a closed position when the steering drive or steering angle transmitter is in the straight-ahead travel position.

* * * * *

UNITED STATES PATENT AND TRADEMARK OFFICE
CERTIFICATE OF CORRECTION

PATENT NO. : 6,896,092 B2
DATED : May 24, 2005
INVENTOR(S) : Eugen Stall

It is certified that error appears in the above-identified patent and that said Letters Patent is hereby corrected as shown below:

Title page,
Item [57], ABSTRACT,
Line 12, "steering drive (2)" should read -- steering drive (11) --.

Column 12,
Line 42, "actuating the a stop" should read -- actuating a stop --.

Signed and Sealed this

Third Day of January, 2006

JON W. DUDAS
*Director of the United States Patent and Trademark Office*